United States Patent
Chakra et al.

(10) Patent No.: US 9,026,600 B2
(45) Date of Patent: May 5, 2015

(54) SYSTEM AND METHOD FOR UNFILTERING FILTERED STATUS MESSAGES

(71) Applicant: International Business Machines Corporation, Armonk, NY (US)

(72) Inventors: Al Chakra, Apex, NC (US); Michael S. Thomason, Raleigh, NC (US); Tong Yu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/734,287

(22) Filed: Jan. 4, 2013

(65) Prior Publication Data

US 2014/0195618 A1 Jul. 10, 2014

(51) Int. Cl.
*G06F 15/16* (2006.01)
*H04L 12/58* (2006.01)

(52) U.S. Cl.
CPC .............. *H04L 51/12* (2013.01); *H04L 51/043* (2013.01)

(58) Field of Classification Search
USPC .................................................. 709/206, 224
See application file for complete search history.

(56) References Cited

U.S. PATENT DOCUMENTS

| | | | |
|---|---|---|---|
| 2005/0234850 A1* | 10/2005 | Buchheit et al. | 707/1 |
| 2006/0200526 A1* | 9/2006 | Cina | 709/206 |
| 2007/0156886 A1* | 7/2007 | Srivastava | 709/224 |
| 2008/0059586 A1* | 3/2008 | Keohane et al. | 709/206 |
| 2009/0098886 A1 | 4/2009 | Kiss et al. | |
| 2009/0254619 A1 | 10/2009 | Kho et al. | |
| 2010/0211645 A1* | 8/2010 | Wang et al. | 709/206 |
| 2011/0072363 A1* | 3/2011 | Mandel et al. | 715/752 |
| 2013/0024780 A1* | 1/2013 | Sutedja et al. | 715/752 |
| 2013/0095889 A1* | 4/2013 | Nguyen et al. | 455/557 |

\* cited by examiner

*Primary Examiner* — Philip B Tran
(74) *Attorney, Agent, or Firm* — Ryan Lewis; Arnold Bangali

(57) ABSTRACT

An approach for unfiltering a filtered electronic communication is provided. In one aspect, a computer system receives filtered electronic communication, wherein the filtered electronic communication is a status message. Moreover, the computer system determines a requestor of the filtered electronic communication. The computer system also detects an attempt made to communicate with the requestor. Furthermore, the computer system unfilters, in response to the attempt, the filtered electronic communication.

20 Claims, 5 Drawing Sheets

SYSTEM AND METHOD FOR UNFILTERING FILTERED STATUS MESSAGES

FIELD OF THE INVENTION

The present invention relates generally to email messaging applications, and more particularly to unfiltering previously filtered status messages of the email messaging applications of at least one messaging device.

BACKGROUND

The Information Age, also known as the Digital Age or Computer Age is characterized by the ability to generate, process, transfer, and share information in a negligible amount of time. Furthermore, communication services for transmitting electronic messages over a network of messaging devices have played an important role in technical progression of the Information Age. Furthermore, wireless communication services of the messaging devices are continually becoming more widely used and more versatile to transmit the electronic messages.

For instance, certain communication services have the ability to transfer wireless communication, including, for example, emails or text messages using, for example, short message service (SMS) on mobile computing devices. In addition, instant messaging (IM) mobile solutions can enhance conventional SMS wireless communication. For example, Mobile Instant Messaging (MIM) can enhance SMS through the use of suitable Internet Protocol (IP) technology and presence information. Moreover, the mobile industry includes one or more of SMS and IM clients, and SMS Centers (SMSCs) and IM enablers to service SMS and IM clients. In addition, as SMS becomes more and more widespread, it is likely to be relied on for wirelessly transmitting electronic messages in a broad spectrum of computing technologies over the Internet.

SUMMARY

In one embodiment, a method is provided for unfiltering a previously filtered electronic message. The method comprises a computer system receiving a filtered electronic communication, wherein the filtered electronic communication is a status message. The method further comprises the computer system determining a requestor of the filtered electronic communication. The method further comprises the computer system detecting an attempt made to communicate with the requestor. The method further comprises the computer system unfiltering, in response to the attempt, the filtered electronic communication In another embodiment, a computer system is for unfiltering a previously filtered electronic message. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to receive a filtered electronic communication, wherein the filtered electronic communication is a status message. The computer system further comprises program instructions to determine a requestor of the filtered electronic communication. The computer system further comprises program instructions to detect an attempt made to communicate with the requestor. The computer system further comprises program instructions to unfilter, in response to the attempt, the filtered electronic communication.

In yet another embodiment, a computer program product is provided for unfiltering a previously filtered electronic message. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further program instructions to receive a filtered electronic communication, wherein the filtered electronic communication is a status message, wherein the filtered electronic communication is a status message. The computer program product further comprises program instructions to determine a requestor of the filtered electronic communication. The computer program product further comprises program instructions to detect an attempt made to communicate with the requestor. The computer program product further comprises program instructions to unfilter, in response to the attempt, the filtered electronic communication.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein like reference numerals indicate like components, and:

DETAILED DESCRIPTION

Embodiments of the present invention provide functionality for unfiltering a previously filtered electronic communication or message of a requestor application. The requestor application can be an email application of a requestor.

In one embodiment, the requestor sends a filtered email status message to a responder indicating that they are unable to communicate with the responder via the requestor application of one or more electronic communication devices of the requestor. In another embodiment, the email status message is unfiltered or otherwise made visible to the responder when a server program of the present invention detects an attempt by the responder to communicate with the requestor via one or more electronic communication software applications of the responder, including for example, an instant messenger. For example, the server program detects an attempt by responder to communicate with the participant when the responder expands a buddy list of a messaging program that contains an identification of the referenced requestor, wherein the responder makes an attempt to contact the requestor via email or views the status of the requestor on the buddy list. In one aspect, the server program queries the responder application for status messages pertaining to the identification of requestor of the buddy list, and unfilters the status message of the messaging program to make the email status message of the requestor visible to the responder. In another aspect, the server program transmits the annotated status message to responder's message program with the unfiltered status message.

Figure 1:
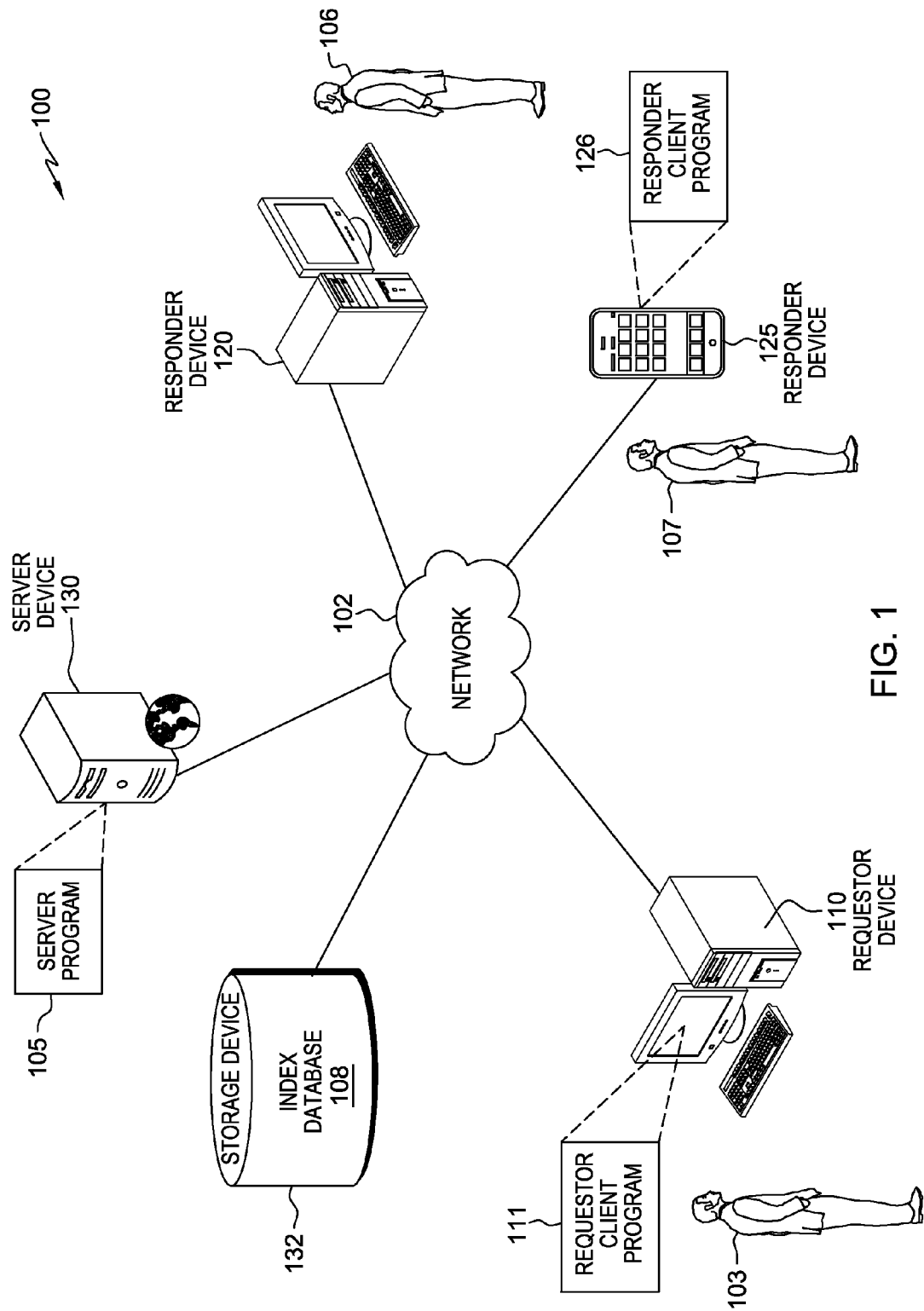
FIG. 1 is a functional block diagram of a message filtering system, in accordance with an embodiment of the present invention.

Further aspects of the present invention will now be described in conjunction with the Figures. Referring to FIG. 1, message filtering system 100 for unfiltering a previously filtered electronic communication is shown.

Message filtering system 100 comprises network 102, requestor device 110, responder devices 120, 125, server device 130 and storage device 132 containing index database 108. Requestor device 110 and responder devices 120, 125 are clients to server device 130, interconnected over network 102. Requestor device 110 and responder devices 120, 125 operate over network 102 with server device 130 to facilitate unfiltering of filtered electronic messages or communication between requestor 103 and responders 106, 107 in message filtering system 100. In one aspect, requestor 103 can be a host that sends filtered message to responders 106, 107. Responders 106, 107 can colleagues that makes an attempt to contact the requestor 103 via email or other messaging means, wherein a server program 105 of the present invention unfilters a previously filtered electronic message sent by requestor 103 based on the attempt, as described in more details below, in accordance with embodiments of the present invention.

Requestor device 110 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Requestor device 110 comprises requestor client program 111. Requestor client program 111 can be any type of software application that is compatible to retrieve and display electronic messages from requestor 103 via an electronic message from requestor 103, in accordance with embodiments of the present invention. In addition, responder devices 120, 125 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Each one of responder devices 120, 125 comprises an instance of responder client program 126. Responder client program 126 any type of software application that is compatible to receive and display electronic messages to responders 106, 107, in accordance with embodiments of the present invention.

Server device 130 can be, for example, a server computer system such as a management server, a web server, or any other electronic device or computing system capable of receiving and sending data, and filtering or unfiltering electronic messages, in accordance with an embodiment of the present invention. Furthermore, server device 130 can also represent a "cloud" of computers interconnected by one or more networks, where server device 130 can be a primary server for a computing system utilizing clustered computers when accessed through network 102. For example, a cloud computing system can be an implementation of a message filtering system for filtering or unfiltering the electronic messages between requestor 103 and responders 106, 107 in real time, in accordance with an embodiment of the present invention.

Server device 130 includes server program 105. Server program 105 performs all necessary functions filter or unfilters electronic messages based on one or more status messages of the electronic message.

Storage device 132 can be any type of storage device, storage server, storage area network, redundant array of independent discs (RAID), cloud storage service, or any type of data storage. Index database 108 can be a database of indexed web pages pertaining to email or other electronic documents stored in storage device 132 for retrieval by requestor client program 111 or responder client program 126, over network 102. In one aspect, once retrieved, the electronic documents can be displayed in a user interface of requestor device 110 and responder device 120, 125 for viewing by requestor 103 or responders 106, 107, in accordance with one embodiments of the present invention.

Network 102 includes one or more networks of any kind that can provide communication links between various devices and computers connected together within message filtering system 100. Network 102 can also include connections, such as wired communication links, wireless communication links, or fiber optic cables. In addition, network 102 can be implemented as a number of different types of networks, including, for example, a local area network (LAN), wide area network (WAN) or a packet switched telephone network (PSTN), or some other networked system. In one embodiment, network 102 is the Internet representing a worldwide collection of networks. The term "Internet" as used according to embodiments of the present invention refers to a network or networks that uses certain protocols, such as the TCP/IP protocol, and possibly other protocols, such as the hypertext transfer protocol (HTTP) for hypertext markup language (HTML) documents that make up the world wide Web (the web). Further, content from the Internet is often provided by content servers, including, for example, server device 130 and is transmitted to client display devices, including, for example, requestor device 110 and responder devices 120, 125. At the heart of the Internet is a backbone of high-speed data communication lines between major nodes or host computers, consisting of thousands of commercial, government, educational and other documents that can be transferred in a message filtering system application between requestor 103 and responders 106, 107, according to an embodiment of the present invention.

Figure 2:
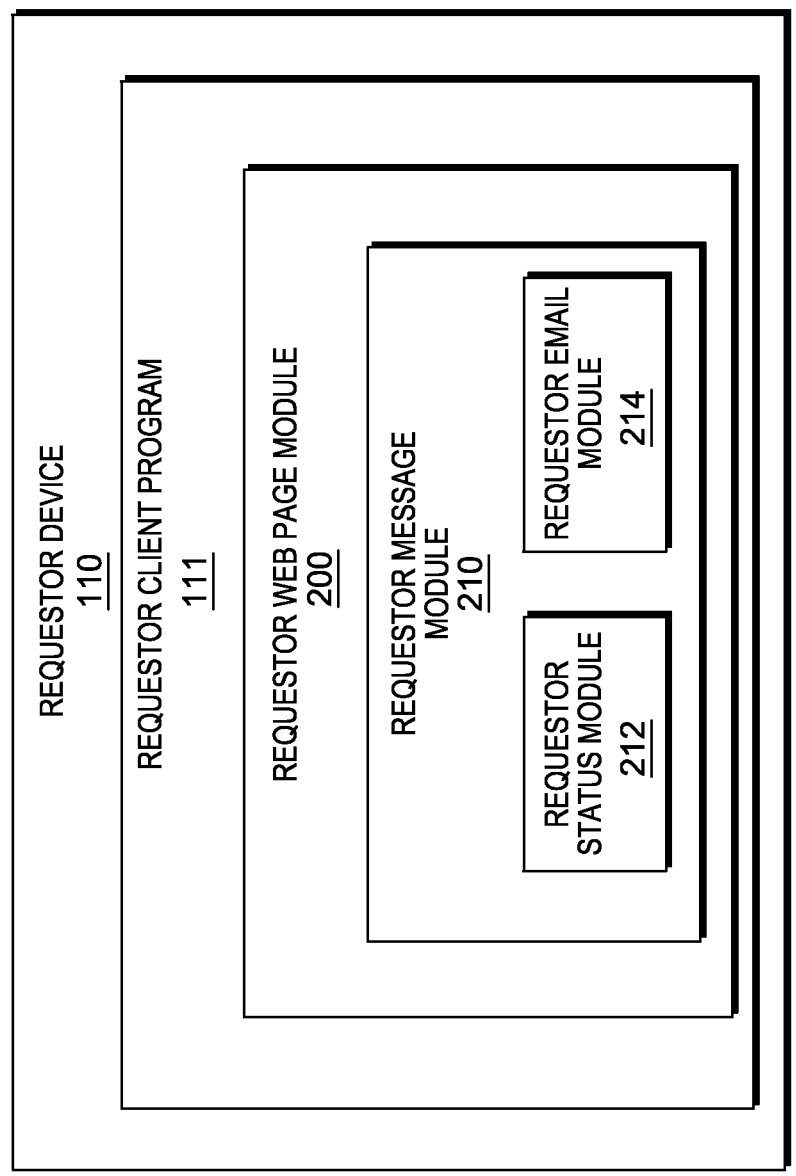
FIG. 2 is a functional block diagram illustrating program components of a requestor device in accordance with an embodiment of the present invention.

FIG. 2 is a functional block diagram illustrating program components of requestor device 110 in accordance with an embodiment of the present invention.

In the depicted embodiment, requestor device 110 comprises requestor client program 111. Requestor client program 111 can among other things, retrieve and display content accessible via network 102, such as web pages. In one embodiment, requestor client program 111 is a web browser. Examples of web browsers include Internet Explorer® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively. Furthermore, the web page received in requestor client program 111, comprises requestor web page module 200. Requestor web page module 200 includes program code, such as Hyper-Text Markup Language (HTML) code or JavaScript code that when executed, adds one or more user interface elements to requestor client program 111.

In at least one embodiment, requestor web page module 200 is a web browser plugin/add-on that extends the functionality of requestor client program 111 by adding additional user interface elements to a user interface of requestor client program 111. The additional user interface elements allow requestor 103 to set an availability status message on an electronic message application, and associate or configured availability status message with an email or message filter application, wherein the email application filters an email or electronic message based on the availability status of requestor 103, in accordance with embodiments of the present invention. In at least one embodiment, requestor web page module 200 comprises requestor message module 210. Requester message module 210 is a web browser plugin/add-on that extends the functionality of requestor web page module 200 by adding additional user interface elements to a user interface of requestor web page module 200.

Requestor message module 210 allows requestor 103 to define one or more email filters for filtering emails based on availability of requestor 103. In particular, requestor message module 210 allows requestor 103 to set an availability status based on availability of requestor 103 in requestor status module 212, and configures the availability status in requestor email module 214, wherein the configured availability status is filtered by requestor email module 214. Requestor message module 210 is an electronic message transmission program.

The electronic message transmission program supports transmission of filtered or unfiltered information between requestor 103 and responder 106, 107, in accordance with embodiments of the present invention. In one aspect of the present invention, requestor 103 can set availability status of requestor 103 on requestor status module 212 in numerous ways, including, for example, via the user interface of requestor client program 111 of requestor email module 214, or via other electronic messaging means, including, for example, an instant message application. Furthermore, requestor email module 214 and the other electronic messaging means can be provided in a single integrated application with requestor status module 212. In one example, requestor 103 can define the following one or more status messages or availability levels on requestor status module 212: "very busy"; "busy", and "normal". For each status message, requestor 103 can further configure or define any number of email filters based on the status message on requestor email module 214, including for example, "very busy", "busy" or "normal" based email filtering preferences of requestor 103. In one aspect, the filtered status message of requestor email module 214 is transmitted to server program 105 for transmission to responder client program 126. For example, requestor 103 emails his department team members indicating that his instant messaging client is not working and provides an alternate contact information. In one aspect, responders 106, 107 receive the email message pertaining to the status message of requestor 103. Furthermore, requestor email module 214 filters the status of the email message based on configuration set by requestor 103. In this manner, the email sent by requestor 103 comprises the status message that is filtered by requestor email module 214, wherein the filtered status message of requestor email module 214 is transmitted to responder client program 125 for display to responders 106, 107, in accordance with embodiments of the present invention.

Figure 3:
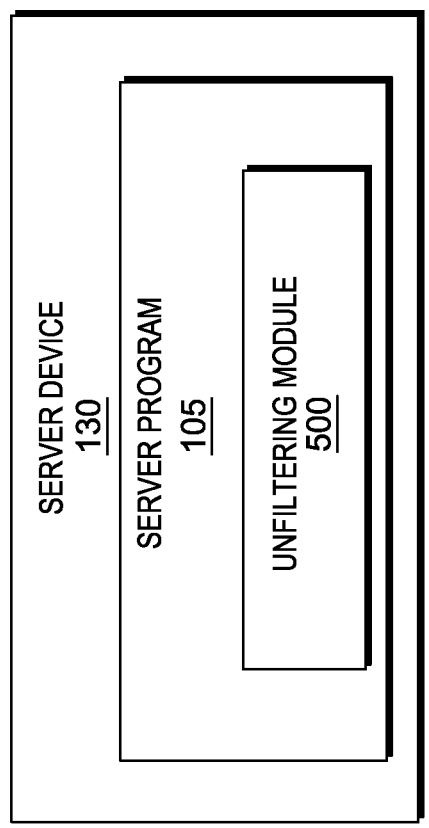
FIG. 3 is a functional block diagram illustrating program components of server device in accordance with an embodiment of the present invention.

FIG. 3 is a functional block diagram illustrating program components of server device 130 in accordance with an embodiment of the present invention.

Server device 130 comprises server program 105. In one aspect, server program 105 performs functions to unfilter previously filtered electronic message configured by requestor 103 on requestor message module 210, and transmitted to server program 105 by requestor client program 111. Once transmitted, the filtered status message of requestor email module 214 is detected by server program 105. In one aspect, server program 105 detects the filtered status message to identify sender of the filtered status message, for example, server program 105 detects information of the filtered status message, including for example, duration or frequency of the filtered status message, user ID of the status message, including user ID pertaining to requestor 103, and application or tool that is associated with the filtered status message, pertaining to requestor 103. Furthermore, server program 105 stores the detected information of the filtered email status message of the email in storage device 132 for future retrieval by responders 106, 107.

In one embodiment of the present invention, sever program 105 monitor user activities of responders 106, 107 to access the of the filtered status message of the stored email. In another embodiment of the present invention, if server program 105 detects an attempt by responders 106, 107 to access the stored filtered email of the status message, unfiltering module 500 unfilters or other makes the stored filtered status message of the email visible to responders 106, 107 Responders 106, 107 can make an attempt to access the stored filtered status message of the email if responders 120, 106 attempts to contact requestor 103 of the stored filtered status message. In one example, requestor 103 emails his department members, on requestor email module 214, indicting that his messaging application of requestor client program 111 is not working, and hence requestor 103 is unavailable to correspond with his department member, including for example responders 106, 107. Furthermore, requestor email module 214 filters the email status message, and transmits the filtered email to responders 106, 107 via requestor message program 210. In this manner, responder message program 210 receives the filtered status message of the email. In another example, if responders 106, 107 attempts to contact requestor 103, via one or more electronic messaging applications, including, for example, a messaging program, including Lotus® Notes® (Lotus Notes are trademarks of the International Business Machines in the United States, other Countries, or Both), sever program 105 detects the attempt by responders 106, 107 to contact requestor 103.

Furthermore, server program 105 queries the stored filtered email for status messages pertaining to requestor 103 and unfilters the stored filtered electronic message, by making the filtered electronic message visible to responder 106, 107. In this manner, the status message is displayed to responder 106, 107. In one aspect, the message can be depicted as important by highlighting or coloring which can render the status message as relevant or in need of attention by requestor 103. In another aspect, server program 105 can then display the highlight status message to responders 106, 107, in accordance with embodiments of the present invention.

Figure 4:
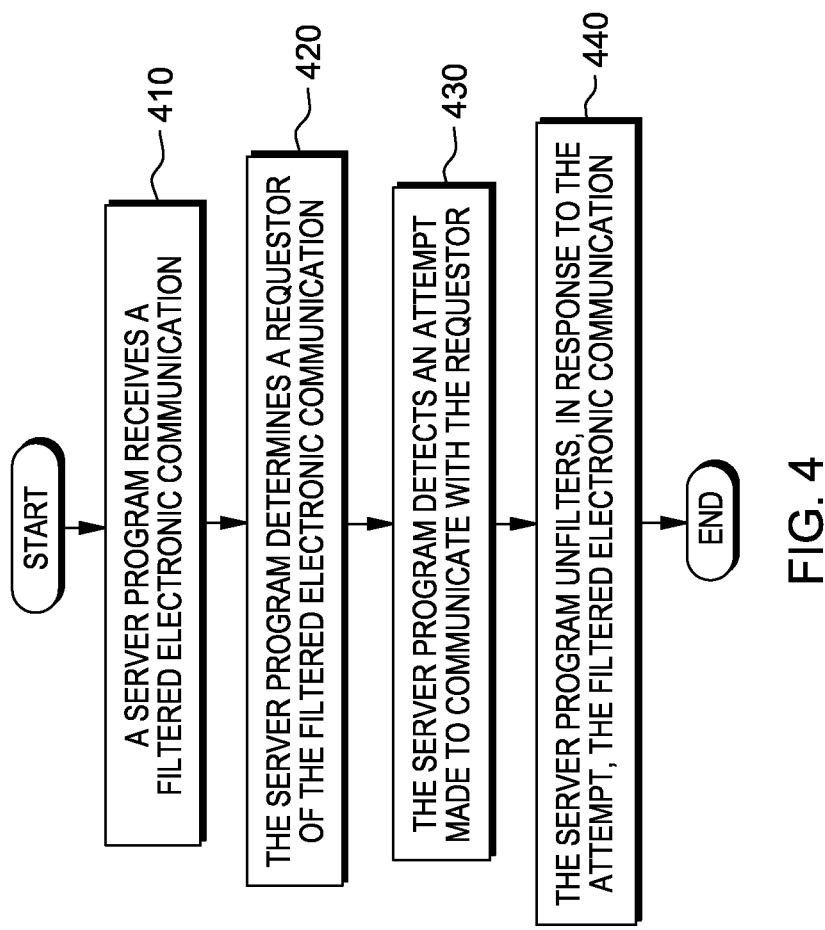
FIG. 4 is a flowchart depicting steps performed by a server program in accordance with embodiments of the present invention.

FIG. 4 is a flowchart depicting steps performed by server program 105 in accordance with embodiments of the present invention. In step 410, server program 105 receives a filtered electronic communication, wherein the filtered electronic communication is a status message. In step 420, determines a requestor of the filtered electronic communication. In step 430, detects an attempt made to communicate with the requestor. In step 440, server program 105 unfilters, in response to the attempt, the filtered electronic communication.

Figure 5:
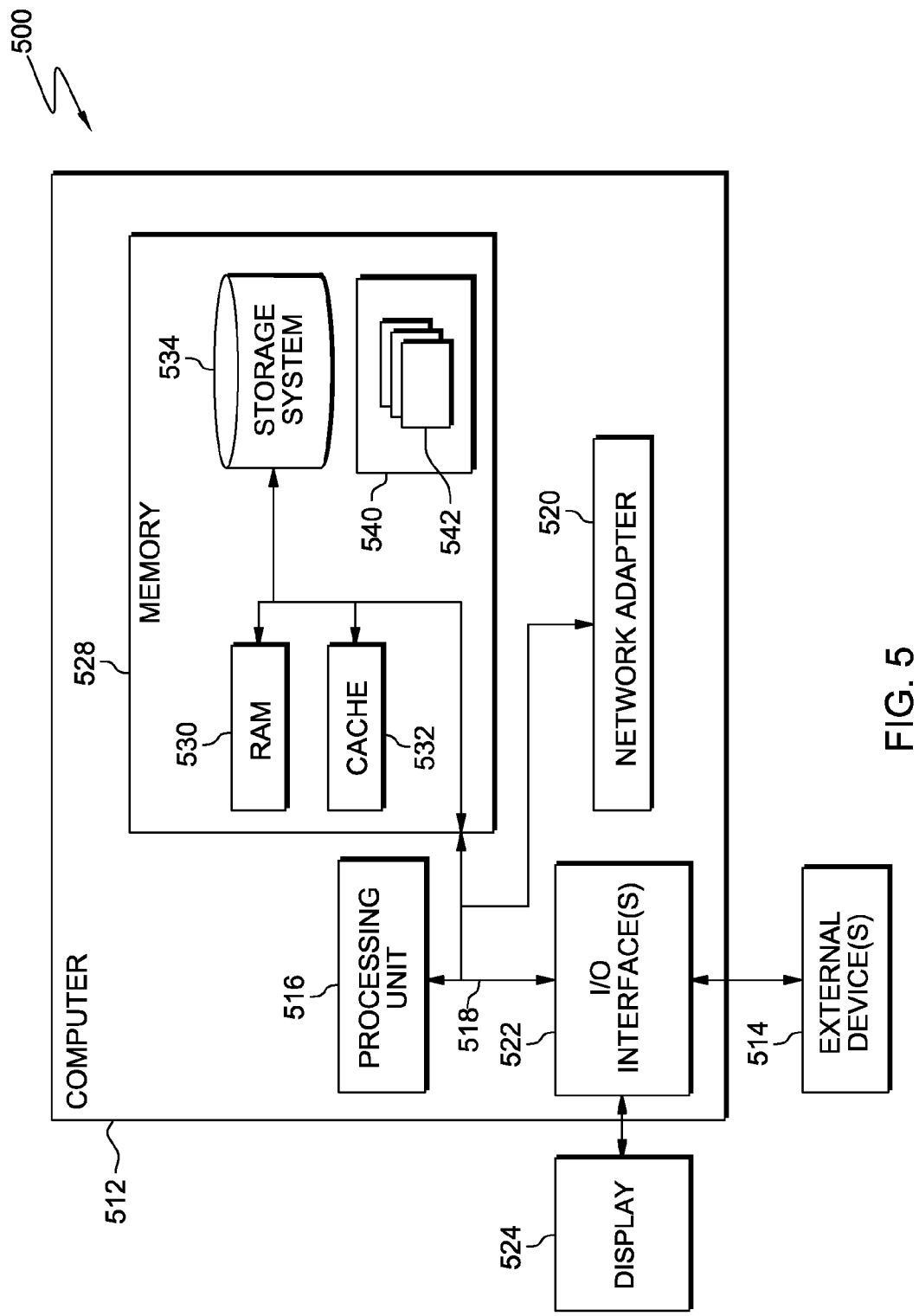
FIG. 5 illustrates a block diagram of components of computer system in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of requestor 103, responders 106, 107, and server device 130 can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Requestor client program 111, responder client program 126 and server program 105 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of requestor client program 111, responder client program 126 and server program 105 are implemented as or are an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for unfiltering a filtered electronic communication within a computer system has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for unfiltering a filtered electronic communication within a computer system, the method comprising the steps of:
   receiving a filtered electronic communication, wherein the filtered electronic communication is a status message;
   determining a requestor of the filtered electronic communication;
   detecting an attempt made to communicate with the requestor; and
   unfiltering, in response to the attempt, the filtered electronic communication.

2. The method according to claim 1, further comprising the step of:
   storing, within a repository of the computer system, the duration or frequency of status message, requestor identification, application, or tool that is associated with the filtered electronic communication.

3. The method according to claim 2, wherein the requestor identification includes identification of a requestor of the electronic communication, and wherein the duration or frequency of status message is duration or frequency of a status message of the electronic communication of the requestor.

4. The method according to claim 1, wherein the step of detecting an attempt made to communicate with the requestor further comprises the step of: monitoring responder activities to access the filtered electronic communication of the requestor.

5. The method according to claim 1, further comprising the step of:
   transmitting the unfiltered electronic communication to at least one responder.

6. The method according to claim 5, wherein the transmitted electronic communication is displayed in a user interface of a responder device of the at least one responder.

7. The method according to claim 1, further comprising the step of:
   notifying at least one responder that the filtered electronic communication is currently unfiltered.

8. A computer system for unfiltering a filtered electronic communication, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to receive a filtered electronic communication, wherein the filtered electronic communication is a status message;
program instructions to determine a requestor of the filtered electronic communication;
program instructions to detect an attempt made to communicate with the requestor; and
programs instructions to unfilter, in response to the attempt, the filtered electronic communication.

9. The computer system according to claim 8, further comprising:
program instructions to store, within a repository of the computer system, the duration or frequency of status message, requestor identification, application, or tool that is associated with the filtered electronic communication.

10. The computer system according to claim 9, wherein the requestor identification includes identification of a requestor of the electronic communication, and wherein the duration or frequency of status message is duration or frequency of a status message of the electronic communication of the requestor.

11. The computer system according to claim 8, wherein program instructions to detect an attempt made to communicate with the requestor further comprises: program instructions to monitor responder activities to access the filtered electronic communication of the requestor.

12. The computer system according to claim 8, further comprising program instructions to transmit the unfiltered electronic communication to at least one responder.

13. The computer system according to claim 12, wherein the transmitted electronic communication is displayed in a user interface of a responder device of the at least one responder.

14. The computer system according to claim 8, further comprising program instructions to notify at least one responder that the filtered electronic communication is currently unfiltered.

15. A computer program product for unfiltering a filtered electronic communication, the program product comprising: one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to receive a filtered electronic communication, wherein the filtered electronic communication is a status message;
program instructions to determine a requestor of the filtered electronic communication;
program instructions to detect an attempt made to communicate with the requestor; and
programs instructions to unfilter, in response to the attempt, the filtered electronic communication.

16. The computer program product according to claim 15, further comprising:
program instructions to store, within a repository of the program product, the duration or frequency of status message, requestor identification, application, or tool that is associated with the filtered electronic communication.

17. The computer program product according to claim 16, wherein the requestor identification includes identification of a requestor of the electronic communication, and wherein the duration or frequency of status message is duration or frequency of a status message of the electronic communication of the requestor.

18. The computer program product according to claim 15, wherein program instructions to detect an attempt made to communicate with the requestor further comprises: program instructions to monitor responder activities to access the filtered electronic communication of the requestor.

19. The computer program product according to claim 15, further comprising program instructions to transmit the unfiltered electronic communication to at least one responder.

20. The computer program product according to claim 19, wherein the transmitted electronic communication is displayed in a user interface of a responder device of the at least one responder.

* * * * *